(12) United States Patent
Slaughter, Jr. et al.

(10) Patent No.: US 6,598,689 B1
(45) Date of Patent: Jul. 29, 2003

(54) ROLLER CONE FOR DRILL BIT HAVING IMPROVED RESISTANCE TO FATIGUE CRACKING

(75) Inventors: Robert Harlan Slaughter, Jr., Ponca City, OK (US); Fakhroldin Mohammad Jadbabaei, Stillwater, OK (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/641,109

(22) Filed: Aug. 17, 2000

(51) Int. Cl.$^7$ ................................................ E21B 10/08
(52) U.S. Cl. ........................................ 175/331; 76/108.2
(58) Field of Search ................................ 175/331, 374, 175/420.1; 76/158.2

(56) References Cited

U.S. PATENT DOCUMENTS

| | | | |
|---|---|---|---|
| 3,970,158 A | 7/1976 | Black et al. ................. | 175/410 |
| 4,181,187 A | 1/1980 | Lumen ......................... | 175/410 |
| 4,969,378 A | * 11/1990 | Lu et al. ....................... | 76/108.2 |

* cited by examiner

*Primary Examiner*—David Bagnell
*Assistant Examiner*—Jennifer Dougherty
(74) *Attorney, Agent, or Firm*—Rosenthal & Osha L.L.P.

(57) ABSTRACT

A roller cone for a drill bit is disclosed which includes a cone body having a plurality of sockets. An interior portion of at least one of the sockets is treated on an interior surface of the socket to provide a residual compressive stress proximate the interior of the socket to reduce stress cracking. Forms of treating include shot peening, laser shock peening and hammer peening. In one embodiment, the socket is treated over approximately the lower 50 percent of the lateral wall. In another embodiment, the socket is treated on the bottom surface from the lateral wall inward approximately 33 percent of the diameter of the socket. Another aspect of the invention is a roller cone for a drill bit including a cone body having a plurality of sockets formed in the cone. In this aspect, an interior portion of at least one of the sockets is locally annealed on an interior surface of the socket. In one embodiment, the socket is locally annealed over approximately the lower 50 percent of the lateral wall. In another embodiment, the socket is locally annealed on the bottom surface from the lateral wall inward approximately 33 percent of the diameter of the socket.

20 Claims, 3 Drawing Sheets ically transmitted from the field of roller
ROLLER CONE FOR DRILL BIT HAVING IMPROVED RESISTANCE TO FATIGUE CRACKING

BACKGROUND OF THE INVENTION

1. Field of the Invention

The invention is related generally to the field of roller cone drill bits. More particularly, the invention is related to methods for making the roller cones for a roller cone drill bit which provide the cones with increased resistance to stress-induced cracking.

2. Description of the Related Art

Roller cone drill bits known in the art include at least one, and generally three, roller cones rotatably mounted on corresponding legs which are joined to the bit body, the roller cones each typically have a plurality of cutting elements distributed about the exterior of the cone. The roller cone is typically made from steel or other high strength material. The cone may be treated in some areas on its surface to reduce susceptibility to wear. The cutting elements may be formed from the same base material as the cone, as is the case for so-called "milled tooth" bits, or may be separate elements inserted into sockets formed in the cone. This type of cutting element is referred to as an "insert". Inserts are generally made from tungsten carbide, diamond, boron nitride, or other individual or combinations of hard or superhard materials.

A typical prior art roller cone having insert type cutting elements is shown in FIG. 1. The cone is shown at 10, and the inserts are shown at 12. The inserts 12 are typically pressed into sockets (not shown in FIG. 1), where the external size of each insert and the internal size of the corresponding socket are such that the insert has an interference fit in the corresponding socket.

The stresses applied to the inserts and the cones during typical drilling operation are very high and are cyclical. The cyclical nature of the stress results from the fact that each cutting element is only in contact with rock being drilled for a portion of the time the drill bit is being rotated. As a result, it is common for the cone to crack within some of the sockets. Cracking in one or more of the sockets can result in loss of the inserts pressed into the sockets which undergo cracking, or can result in total cone failure.

Various methods have been developed to adjust the distribution of stresses in roller cones, with the objective of reducing cracking and insert loss. For example, U.S. Pat. No. 4,181,187 issued to Lumen describes cutting stress relief grooves in the bottom of the sockets. U.S. Pat. No. 3,970,158 issued to Black describes placing a compressible (malleable) material at the bottom of the sockets to absorb some of the cyclic stress applied to the inserts. The malleable material extrudes against the sides of the socket to reduce the incidence of cracking.

SUMMARY OF THE INVENTION

One aspect of the invention is a roller cone for a drill bit which includes a cone body having a plurality of sockets. An interior portion of at least one of the sockets is treated to provide residual compressive stress on an interior surface of the socket. In one embodiment, the treating includes shot peening. In another embodiment, the treating includes hammer peening. In another embodiment, the treating includes laser shock peening.

In one embodiment according to this aspect of the invention, the socket is treated over approximately the lower 50 percent of the lateral wall of the socket.

In another embodiment according to this aspect of the invention, the socket is treated on its bottom surface from the lateral wall inward approximately 33 percent of the diameter of the socket.

In a particular embodiment, the socket is treated over approximately the lower 50 percent of the lateral wall of the socket and the socket is treated on its bottom surface from the lateral wall inward approximately 33 percent of the diameter of the socket.

Another aspect of the invention is a roller cone for a drill bit including a cone body having a plurality of sockets formed in the cone. In this aspect of the, invention, an interior portion of at least one of the sockets is locally annealed on an interior surface of the socket.

In one embodiment, the socket is locally annealed over approximately the lower 50 percent of its lateral wall.

In another embodiment, the socket is locally annealed on the bottom surface from its lateral wall inward approximately 33 percent of the diameter of the socket.

In a particular embodiment, the socket is locally annealed over approximately the lower 50 percent of its lateral wall and the socket is locally annealed on the bottom surface from its lateral wall inward approximately 33 percent of the diameter of the socket.

DETAILED DESCRIPTION

Figure 1:
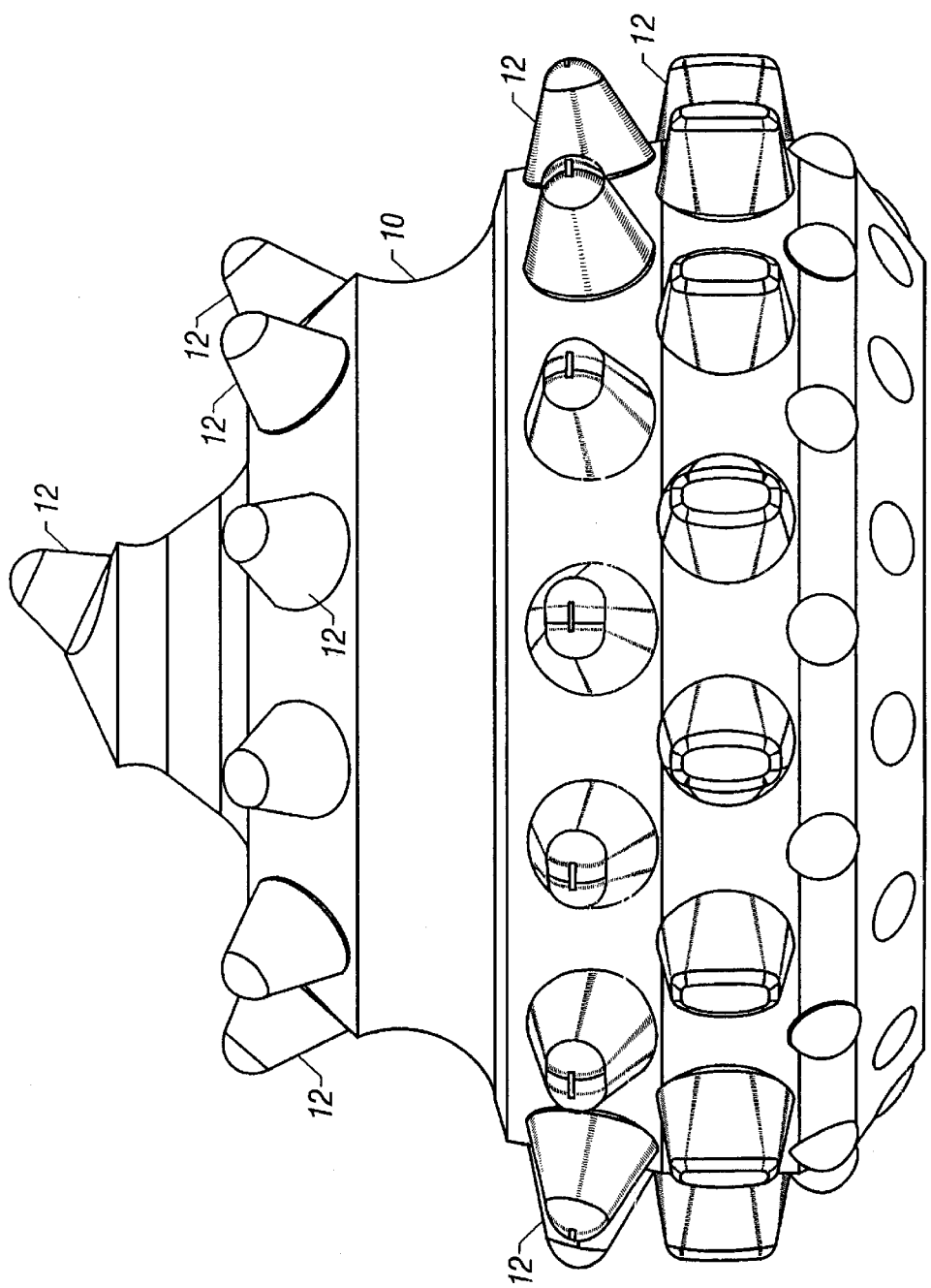
FIG. 1 shows a prior art roller cone having insert-type cutting elements inserted therein.
Figure 2:
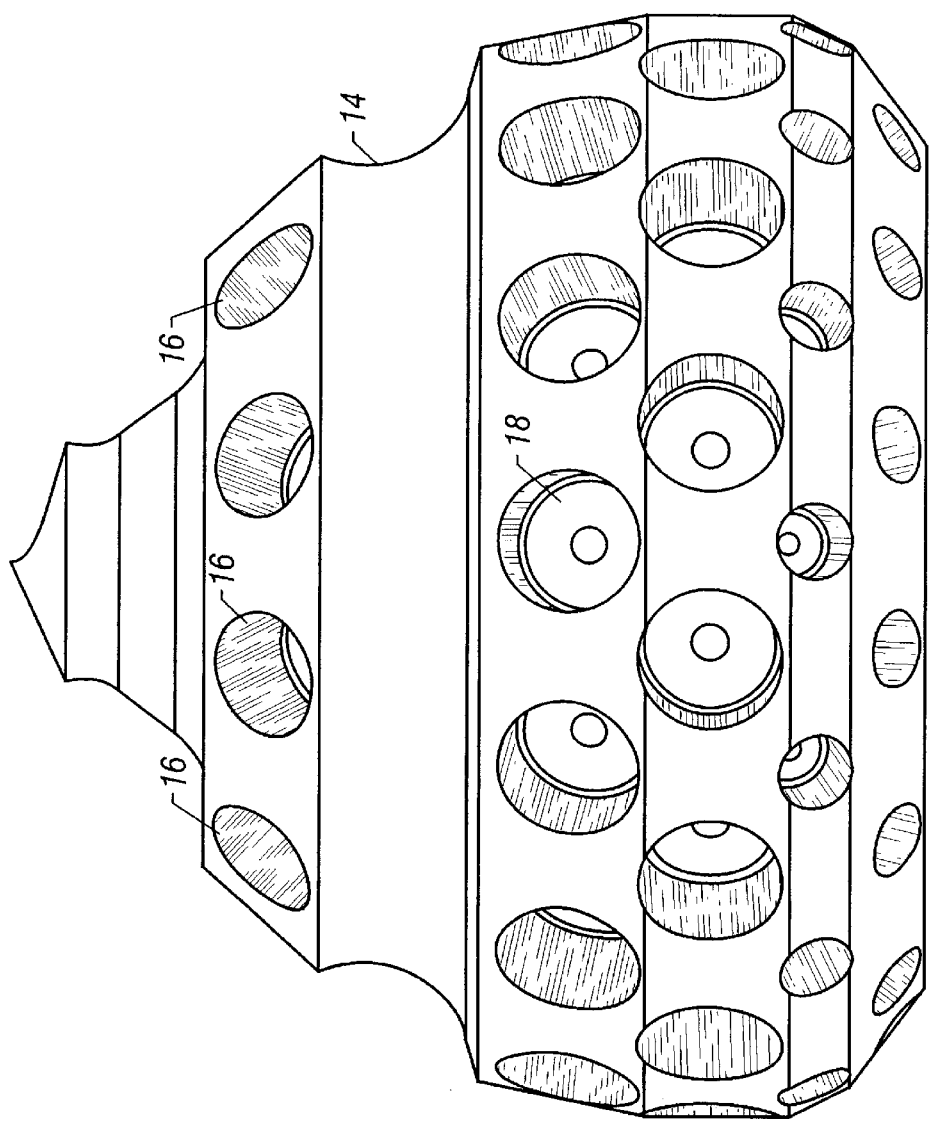
FIG. 2 shows a roller cone having sockets drilled therein for processing according to the invention.

A roller cone for a drill bit which can be made according to the invention is shown at 14 in FIG. 2. The cone 14 is typically made from steel or other high strength material and includes a plurality of sockets, shown generally at 16, that are drilled in selected locations on the cone 14. Each socket 16 is adapted for receiving therein an insert type cutting element (not shown). The inserts (not shown) can be any type known in the art, including tungsten carbide, natural or synthetic diamond, boron nitride, or any one or combination of hard and/or superhard materials. The material used for the cone 14 and the inserts (not shown) is a matter of discretion for the designer and is not meant to limit the invention. The cone 14 may also, at the option of the designer, have hardfacing (not shown) applied to its exterior surface in any manner known in the art.

One of the sockets 16 shown in FIG. 2 includes a portion, shown generally at 18, which in one aspect of the invention, the interior surface thereof has been treated to provide a residual compressive stress near that portion of the socket 16. In one embodiment, the treatment to provide residual compressive stress is shot peening. Shot peening is known in the art for treating materials to reduce the incidence of stress induced cracking. In a roller cone made according to this aspect of the invention, the interior surface of each of the sockets 16 may be shot peened. However, it is only necessary, for purposes of the invention, to shot seen (or otherwise treat as will be further explained) the interior of at least one of the sockets 16. Any other selected number of the sockets 16 may be shot peened in this aspect of the invention.

Although the entire interior surface of the one or more sockets 16 may be shot peened, the incidence of stress induced cracking can be substantially reduced by shot peening only a selected portion of the interior surface of the sockets 16. This portion is shown in more detail in FIG. 3. Shot peening can be performed on the interior lateral wall 23 of the socket 16 from the bottom thereof (from the juncture of the wall 23 with bottom surface 21) to a distance of about 50 percent of the length of the socket, as shown at 22. The bottom surface 21 of the socket 16 may be peened from the juncture with the lateral wall 23 inward to a distance of about 33 percent of the diameter of the socket 16. Preferably, the juncture of the lateral wall 23 and the bottom surface 21 of the socket 16 includes a radiused corner 20 to further reduce the possibility of cracking in the socket 16.

In one particular embodiment according to this aspect of the invention, the ones of the sockets 16 which are shot peened are peened on the lower 50 percent of the lateral wall 23 and on the bottom surface 21 inward from the lateral wall 23 about 33 percent of the diameter of the socket 16. Preferably, the radius corner 20, when included, should also be shot peened.

Although the various embodiments of this aspect of the invention are described in terms of shot peening the interior surface of the at least one socket, it should be understood that any treatment which provides a residual compressive stress in the cone material proximate the interior of the treated socket can also be used in this aspect of the invention. Two such treatment methods are hammer peening and laser shock peening. Laser shock peening and hammer peening are known in the art for providing residual compressive stress in materials. In some embodiments, the hammer peening and laser shock peening may be performed over the same portions of the interior of the at least one socket as described for shot peening.

Figure 3:
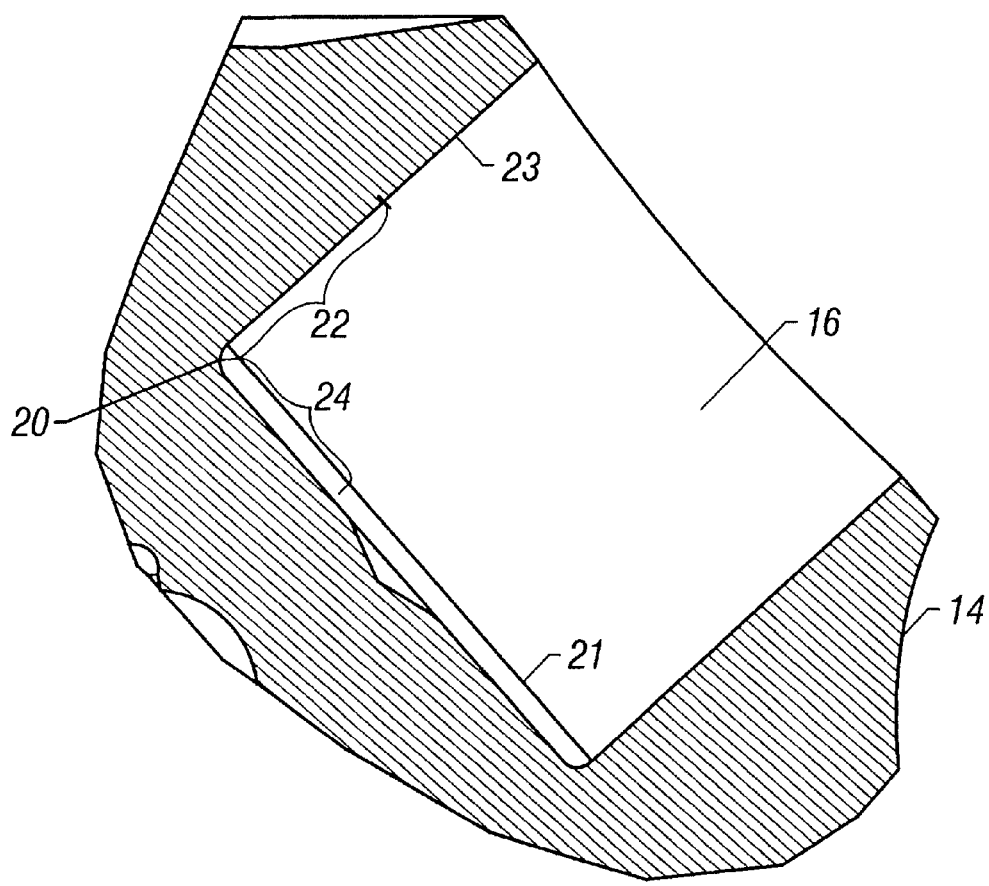
FIG. 3 shows a cross-section of a socket having treating according to one embodiment of the invention.

In another aspect of the invention, and as an alternative to shot peening, the interior surface of one or more of the sockets 16 can be locally annealed. Localized annealing is known in the art can be performed by heating the selected portion of the socket, using resistive heating, inductive heating or direct heating, or other heating methods known in the art. If localized annealing is used to treat the one or more sockets 16, preferably the localized annealing is performed only on a particular portion of the interior of the one or more sockets 16 which is shown in FIG. 3. This portion can be generally described as along the lateral wall 23 of the socket 16 over approximately the lower 50 percent of the length of the socket 16 from the bottom surface 21 of the socket 16, and from the lateral wall 23 inward a distance of about 33 percent of the diameter of the socket 16 along the bottom surface 21 of the socket 16. Preferably the one or more sockets 16 include a radiused corner 20 at the juncture of the bottom surface 21 and the lateral wall 23. If localized annealing is used, the corner 20 should also be annealed. Advantageously, localized annealing preformed according to this embodiment can reduce stress cracking in the one or more sockets 16 while providing good retention of cutting elements (not shown) pressed into the one or more sockets 16 in the portion thereof which is not annealed.

The invention has been described with respect to certain preferred embodiments. Those skilled in the art will appreciate that other embodiments of the invention can be devised which do not depart from the spirit of the invention as disclosed herein. Accordingly, the invention shall be limited in scope only by the attached claims.

What is claimed is:

1. A roller cone for a drill bit, comprising:
   a cone body having a plurality of sockets formed therein, wherein an interior portion of at least one of the sockets is treated to provide residual compressive stress near an interior surface thereof, the treatment comprising one selected from shot peening, laser-shock peening, and hammer peening.

2. The roller cone as defined in claim 1 wherein the at least one socket is treated on a lateral wall thereof over approximately a lowermost 50 percent of thelateral wall.

3. The roller cone as defined in claim 1 wherein the at least one socket is treated over a bottom surface thereof, inward from a lateral wall thereof approximately 33 percent of a diameter of the at least one socket.

4. The roller cone as defined in claim 1 wherein the at least one socket is treated on a lateral wall thereof over approximately a lowermost 50 percent of the lateral wall, and is shot peened over a bottom surface thereof inward from the lateral wall approximately 33 percent of a diameter of the at least one socket.

5. The roller cone as defined in claim 1 further comprising a radiused corner at a juncture of a lateral wall and a bottom surface of the at least one socket.

6. The roller cone as defined in claim 1 wherein substantially all the sockets are treated on an interior surface thereof.

7. The roller cone as defined in claim 6 wherein each of the treated sockets is treated on a lateral wall thereof over approximately a lowermost 50 percent of the lateral wall.

8. The roller cone as defined in claim 6 wherein each of the treated sockets is shot peened over a bottom surface thereof, inward from a lateral wall thereof approximately 33 percent of a diameter of each socket.

9. The roller cone as defined in claim 6 wherein each of the treated sockets is shot peened on a lateral wall thereof over approximately a lowermost 50 percent of the lateral wall; and is treated over a bottom surface thereof inward from the lateral wall approximately 33 percent of a diameter of the at least one socket.

10. The roller cone as defined in claim 6 wherein each of the treated sockets comprises a radiused corner at a juncture of a lateral wall and a bottom surface thereof.

11. A roller cone for a drill bit, comprising:
    a cone body having a plurality of sockets formed therein, wherein an interior portion of at least one of the sockets is locally annealed on an interior surface thereof after the formation of said socket.

12. The roller cone as defined in claim 11 wherein the local annealing is performed on approximately a lowermost 50 percent of a lateral wall of the at least one socket.

13. The roller cone,as defined in claim 11 wherein the local annealing is performed on a bottom surface of the at least one socket from a lateral wall thereof inward a distance of approximately 33 percent of a diameter of the at least one socket.

14. The roller cone as defined in claim 11 further comprising a radiused corner at a juncture of a lateral wall and a bottom surface of the at least one socket.

15. The roller cone as defined in claim 11 wherein the at least one socket is locally annealed on a lateral wall thereof over approximately a lowermost 50 percent of the lateral wall, and is locally annealed over a bottom surface thereof inward from the lateral wall approximately 33 percent of a diameter of the at least one socket.

16. The roller cone as defined in claim 11 wherein substantially all the sockets are locally annealed on an interior surface thereof.

17. The roller cone as defined in claim 16 wherein each of the locally annealed sockets is locally annealed on a lateral wall thereof over approximately a lowermost 50 percent of the lateral wall.

18. The roller cone as defined in claim 16 wherein each of the locally annealed sockets locally annealed over a bottom surface thereof, inward from a lateral wall thereof approximately 33 percent of a diameter of each socket.

19. The roller cone as defined in claim 16 wherein each of the locally annealed sockets comprises a radiused corner at a juncture of a lateral wall and a bottom surface thereof.

20. The roller cone as defined in claim 16 wherein each of the locally annealed sockets is locally annealed on a lateral wall thereof over approximately a lowermost 50 percent of the lateral wall, and is locally annealed over a bottom surface thereof inward from the lateral wall approximately 33 percent of a diameter of the at least one socket.

* * * * *